(12) United States Patent
Knittel et al.

(10) Patent No.: US 6,266,733 B1
(45) Date of Patent: Jul. 24, 2001

(54) TWO-LEVEL MINI-BLOCK STORAGE SYSTEM FOR VOLUME DATA SETS

(75) Inventors: James Knittel, Groton; William Peet, Billerica; Kenneth Correll, Lancaster, all of MA (US)

(73) Assignee: Terarecon, INC, San Mateo, CA (US)

( * ) Notice: Subject to any disclaimer, the term of this patent is extended or adjusted under 35 U.S.C. 154(b) by 0 days.

(21) Appl. No.: 09/191,865

(22) Filed: Nov. 12, 1998

(51) Int. Cl.[7] .................................................. G06F 12/00
(52) U.S. Cl. .............................. 711/5; 711/104; 711/157; 345/424
(58) Field of Search .............................. 711/5, 104, 157; 345/424, 505; 600/410; 623/22.3

(56) References Cited

U.S. PATENT DOCUMENTS

| | | | | |
|---|---|---|---|---|
| 5,295,488 | * | 3/1994 | Lloyd et al. | 600/410 |
| 5,317,689 | * | 5/1994 | Nack et al. | 345/505 |
| 5,548,694 | * | 8/1996 | Frisken Gibson | 623/22.3 |
| 5,831,623 | * | 11/1998 | Negishi et al. | 345/424 |
| 6,008,813 | * | 12/1999 | Lauer et al. | 345/424 |
| 6,069,634 | * | 5/2000 | Gibson | 345/424 |

* cited by examiner

Primary Examiner—Matthew Kim
Assistant Examiner—Fred F. Tzeng
(74) Attorney, Agent, or Firm—Dirk Brinkman

(57) ABSTRACT

A two-level skewing architecture is imposed on the memory subsystem of a volume rendering system in which voxel data is stored in mini-blocks assigned to a set of DRAM memory modules, thereby permitting data transfer at the maximum burst rate of the DRAM memory and enabling real-time volume rendering. Within each DRAM module, mini-blocks are assigned to the memory banks so that consecutively accessed mini-blocks are assigned to different banks, thereby avoiding idle cycles during data transfer and increasing DRAM transfer efficiency to nearly 100%. In one embodiment, read-out of voxel data from banks of the DRAM memory proceeds from left to right unless there is a conflict of banks, in which case the read-out order is reversed. A specialized de-skewing network is provided to re-order the voxel data read out from DRAM memory so that the voxels can be processed in the order which they are arranged in the volume data set rather than the order in which they are stored in memory.

7 Claims, 9 Drawing Sheets

TWO-LEVEL MINI-BLOCK STORAGE SYSTEM FOR VOLUME DATA SETS

CROSS REFERENCE TO RELATED APPLICATIONS

NONE

BACKGROUND OF THE INVENTION

This invention relates to volume rendering and more particularly to a memory architecture which permits real-time volume rendering through the rapid read out of memory using minimum size data blocks for storing volume data sets.

Volume rendering is part of volume graphics, the subfield of computer graphics that deals with the visualization of objects or phenomena represented as sampled data in three or more dimensions. These samples are called volume elements, or "voxels," and contain digital information representing physical characteristics of the objects or phenomena being studied. Volume rendering is the area of volume graphics concerned with the projection of volume data as two-dimensional images for purposes of printing, display on computer terminals, and other forms of visualization. Real-time volume rendering is the projection and display of volume data as a series of images in rapid succession, typically at 30 frames per second or faster, thereby making it possible for a human operator to interactively control the parameters of the projection and to manipulate the image, while providing immediate visual feedback.

While software methods for volume rendering have been practiced for ten to twenty years, they have not been usable for real-time volume rendering, both because of the enormous amount of computing power required and because of the difficulty of reading and moving voxel data fast enough. Even the rapid increase in the power of modern personal computers is unlikely to be enough to support real-time volume rendering in software for many years to come. For example, to render a volume data set with 256 voxels on each edge, that is a total of $256^3$ or more than 16 million voxels, and to do so in real-time, it is necessary to read and process all 16 million voxels at 30 or more times per second. This amounts to reading and processing rate of more than 500 million voxels per second, a rate far exceeding the computing power and memory bandwidth available in a modern personal computer. It will be appreciated that a volume data set of $512^3$ voxels requires a reading and processing rate eight times larger or approximately 4 billion voxels per second, and a volume data set of $1024^3$ voxels requires a reading and processing rate an additional eight times larger again or approximately 32 billion voxels per second. Even by using established software techniques for reducing the number of voxels processed in each frame, the rate still exceeds the memory bandwidth and computing power of a modern personal computer.

However, modern semiconductor technology makes it possible to build a special purpose volume rendering system, for example as an accessory to a personal computer by way of a plug-in circuit board. In such a system, voxel data is stored in a plurality of Dynamic Random Access Memory modules, also called DRAM chips. The data is read and processed by one or more parallel, pipelined processing elements to project images at real-time frame rates. One of the challenges in such a special purpose system is to read the voxel data out of memory fast enough. This exceeds bandwidth of all but the fastest DRAM chips operating in burst mode, that is in a mode of reading a series of data values stored at adjacent memory addresses in rapid succession. Even in this case, it is necessary to maximize the efficiency of memory to nearly 100%, that is, to operate burst mode DRAM chips at nearly 100% of their rated bandwidth.

In U.S. patent application Ser. No. 08/905,238, filed Aug. 1, 1997 and incorporated herein by reference, a real time volume rendering system is described in which voxel data is organized into blocks so that all voxels within a block are stored a single memory module at adjacent memory addresses. This makes it possible to fetch an entire block of data in a burst rather than one voxel at a time, thereby taking advantage of the burst mode access associated with DRAM. Once a block of voxels has been fetched, the voxels are passed to one or more processing pipelines at the rate of one voxel per cycle per pipeline. Meanwhile, the fetching of a subsequent block of voxels begins. A typical high-performance DRAM chip is capable of being operated at rates of 133 million, 147 million, or 166 million data elements per second, corresponding to cycle times of 7.5 nanoseconds, 7 nanoseconds, and 6 nanoseconds, respectively. If each voxel value comprises one DRAM data element, then approximately four DRAM chips are needed to operate in parallel in order to achieve the necessary data rate of 500 million voxels per second.

It will be appreciated that the order of reading blocks of voxel data depends upon the direction of viewing a volume data set, that is the position of the image plane with respect to the volume data set. In order to achieve the necessary voxel reading and processing rate for any viewing direction, it is necessary to distribute voxel data across the DRAM chips of a real-time volume rendering system so that there are no conflicts in the parallel operation of the DRAM chips. This is achieved by the method of "skewing" voxel data as implemented in a system called Cube-4, described in a Doctoral Dissertation entitled "Architectures for real-time Volume Rendering" submitted by Hanspeter Pfister to the Department of Computer Science at the State University of New York at Stony Brook in December 1996, and further described in U.S. Pat. No. #5,594,842, "Apparatus and Method for Real-time Volume Visualization." This method of skewing has been improved and adapted to a memory organization of blocks of voxels in a system called EM-Cube, as described in U.S. patent application Ser. No. 08/905,238, cited above.

The essence of the skewing of the Cube-4 system is that adjacent voxels are stored in different DRAM chips. This is true in all three dimensions, so that it is possible to concurrently fetch any group of adjacent voxels aligned with any axis of the volume data set from the same number of DRAM chips. This maximizes the efficiency of using DRAM chips in parallel, but it inefficiently utilizes the bandwidth of each DRAM chip. The essence of the EM-Cube system is that adjacent blocks of voxels are stored in adjacent DRAM chips, rather than individual voxels. This improves the efficiency of the bandwidth of each DRAM chip, but the amount of the improvement depends upon the size of the blocks, because of the way DRAM chips are organized into banks.

In particular, a modern DRAM chip comprises a plurality of banks of memory, each bank comprising a plurality of rows, and each row comprising a plurality of data elements at consecutive memory addresses. Such a DRAM chip can sustain its maximum rated bandwidth while reading or writing data within a single row of a single bank. At the same time, a row of a different bank can be "pre-charged" or prepared for transfer, so that reading or writing can continue without interruption from the previous row of the previous bank to the new row of the new bank. However, a DRAM chip cannot support the reading of or writing to two different rows of the same bank in quick succession. That is, it is impossible to pre-charge one row of a bank while reading from or writing to a different row of that same bank. Some DRAM chips impose additional constraints, for example, prohibiting the pre-charging of banks adjacent to the one that is active.

Whenever data is organized so that reading or writing to different rows of the same or conflicting banks is required, a delay of several cycles is imposed. In a real-time volume rendering system, the impact of this delay depends upon the size of the blocks. In an embodiment of the EM-Cube system, for example, blocks are 8×8×8 voxels or a total of 512 voxels. In this case, using a DRAM with a delay of eight cycles between rows of the same bank, it is still possible to read voxel data from a DRAM chip at approximately 97% efficiency. However, in a different embodiment having smaller blocks of 2×2×2 voxels or a total of eight voxels, the efficiency of the DRAM bandwidth would be reduced to approximately 50%. The challenge, then, for a real-time volume rendering system is to organize data to maximize the efficiency of DRAM memory, either by keeping blocks large enough or by avoiding accesses to the different rows of the same or conflicting banks in rapid succession.

While the prior system noted above utilized relatively large blocks of voxel data in order to maximize communication efficiency, it has now become desirable to implement the volume rendering system on a single integrated circuit or chip. However, in order to achieve real-time volume rendering performance, a change in the underlying architecture of the storage and distribution of voxel is required.

SUMMARY OF THE INVENTION

In the subject system, a mini-block organization of voxel data is employed to assure that the efficiency of data transfer to and from DRAM memory modules is maximized to a level of nearly 100%. The mini-block organization is such that each mini-block is assigned to a DRAM memory module or chip and further to a specific bank within that DRAM memory module. This constitutes a two-level assignment or skewing of the voxel data across not only memory modules but also the banks contained therein. The memory architecture reduces to a minimum the number of idle cycles which would otherwise contribute to dramatically reduced data rates, as low as 50% or less of the rated bandwidth for the DRAM modules.

Because voxel data is stored in mini-blocks, it can be read in bursts at the maximum data rate of the DRAM module. Because mini-blocks are distributed or skewed across the banks of a DRAM, it becomes possible to read consecutive mini-blocks without incurring idle cycles needed for pre-charging the memory banks. As will be appreciated, each idle cycle represents a lost unit of time during which data could be read, but is not. These idle cycles would reduce the efficiency of data read from memory, and would increase the expense of a real-time volume rendering system or preclude it altogether. Therefore, it is important to avoid them.

Even with the skewing of mini-blocks across banks with each DRAM chip, cases occasionally arise where the fetching of a mini-block from one bank of one DRAM at the end of one row is followed in quick succession by the fetching of a mini-block from the same bank of the same DRAM module at the start of the next row. To avoid this problem, the subject invention utilizes a system for reversing the direction of the read-out of a row of mini-blocks when the next mini-block to be read out would result in a fetch from the same or a conflicting bank of the DRAM memory.

Because the voxel data is distributed across DRAM memory modules in the order of assignment, not the natural of processing for a particular view direction, a specialized de-skewing network is provided to rearrange the outputs of the DRAM modules to re-establish the natural processing order for the given view direction. This is accomplished in one embodiment by the use of a number of internal buffers and a shifting or multiplexing network under the control of an addressing system.

More particularly, in the subject invention, the pipelined processing elements needed for real-time volume rendering are contained in a single integrated circuit implemented on a single semiconductor chip. Because there is no communication with other processing chips and therefore no need to manage the bandwidth of such communication, the requirement for large blocks is eliminated. The subject invention therefore utilizes the smallest size of block that is able to take advantage of burst mode transfers of DRAM chips. In a preferred embodiment, the block is 2×2×2 and is therefore called a mini-block. Mini-blocks are skewed across the volume data set in exactly the same way as in the aforementioned EM-Cube volume rendering system, with the same mathematical formula showing the location of the mini-block in memory.

In order avoid the reduced efficiency of DRAM bandwidth that would result from consecutive fetches from the same bank of a DRAM, the subject invention utilizes a two-level skewing method in which mini-blocks are skewed both across DRAM chips and also across banks within each DRAM chip. That is, adjacent mini-blocks are stored in separate DRAM chips, and within each DRAM chip mini-blocks are stored in separate banks from their nearest neighbors in any direction parallel to the three axes of the volume data set. During rendering, mini-blocks are fetched in groups, the number of mini-blocks in a group being the same as the number of DRAM chips accessible at the same time in the system. Groups of mini-blocks are fetched in an orderly manner, for example in a preferred embodiment by stepping left to right, top to bottom, and front to back when the volume data set is viewed from the image plane. The two-level skewing ensures that successive mini-blocks in any DRAM chips are fetched from different banks and that therefore the efficiency of DRAM bandwidth is maximized.

However, for each arrangement of mini-blocks, method of skewing, and processing order through the volume data set, there is at least one orientation or view direction in which the last mini-block of a row of mini-blocks is stored in the same bank as the first mini-block of the next row of mini-blocks. Without special consideration, this one case would cause a delay in processing, lost efficiency of DRAM bandwidth, or additional complexity in the pipelined processing elements. Therefore, the subject invention compensates for this case by processing those particular rows in the opposite order. That is, if a row of mini-blocks is fetched, for example, from left to right, and if the next row begins with mini-blocks in the same bank as the previous one, the next row is fetched from right to left. By this means, all consecutive fetches to mini-blocks are from different, non-conflicting banks of a DRAM chip.

As mini-blocks are fetched from their corresponding DRAM chips, they are passed through a de-skewing network, that is a circuit that rearranges the voxels according to the view direction and aligns each voxel with the processing pipelines that will process it. In some embodiments, each voxel is associated with precisely one processing pipeline, and adjacent voxel values are obtained by communication from adjacent processing pipelines or from voxel data that is recirculated through FIFOs on the processing chip. In other embodiments, however, a storage buffer on the processing chip called a voxel cache is utilized. In these embodiments, pipelines do not communicate with each other at all but rather fetch the voxels needed for any particular processing from the voxel cache. In either approach, the de-skewing network and voxel cache make it possible for each processing pipeline to retrieve the correct data in the correct order.

In summary, a two-level skewing architecture is imposed on the memory subsystem of a volume rendering system in which voxel data is stored in mini-blocks assigned to a set of DRAM memory modules, thereby permitting data transfer at the maximum burst rate of the DRAM memory and enabling real-time volume rendering. Within each DRAM module, mini-blocks are assigned to the memory banks so that consecutively accessed mini-blocks are assigned to different banks, thereby avoiding idle cycles during data transfer and increasing DRAM transfer efficiency to nearly 100%. In one embodiment, read-out of voxel data from banks of the DRAM memory proceeds from left to right unless there is a conflict of banks, in which case the read-out order is reversed. A specialized de-skewing network is provided to re-order the voxel data read out from DRAM memory so that the voxels can be processed in the order which they are arranged in the volume data set rather than the order in which they are stored in memory.

More particularly, the storage subsystem of a low-cost, real-time volume rendering system delivers volume elements or "voxels" at a sustained data rate approaching the peak rate of burst mode Dynamic Random Access Memory (DRAM) integrated circuits or "chips." This data rate is independent of the view direction, that is the direction of the rays passing through the volume data set, and it scales linearly with the number of DRAM chips in the system. Three-dimensional voxel data is organized into mini-blocks of size 2×2×2. Independence of view direction is achieved by skewing mini-blocks across DRAM modules so that adjacent mini-blocks are stored in adjacent DRAM chips. This guarantees that data can be read from all chips in parallel in every clock cycle and that no data needs to be re-read, thereby maximizing memory bandwidth. Within each DRAM chip, mini-blocks are skewed across memory banks of that chip. This eliminates the pre-charge and reactivation time inherent in successive fetches to different pages of the same bank. Linear scalability of data rate is achieved by increasing the number of DRAM modules in the system. The memory subsystem of the volume-rendering system de-skews the mini-blocks to present voxels to the rendering pipelines at the rate of one voxel per DRAM chip cycle per pipeline.

BRIEF DESCRIPTION OF THE DRAWINGS

The foregoing features of this invention, as well as the invention itself may be more fully understood from the following Detailed Description of the Invention, and Drawing, of which.

DETAILED DESCRIPTION

Pipelined Voxel Rendering

Figure 1:
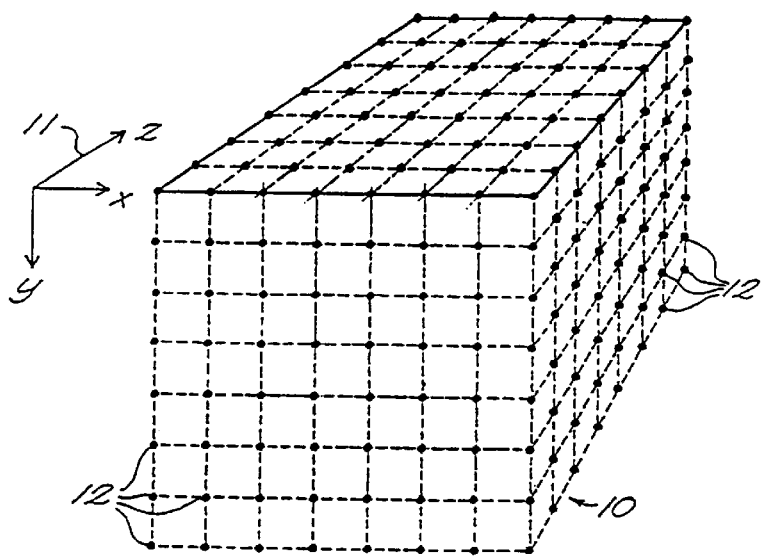
FIG. 1 is a diagrammatic illustration of a volume data set.

Referring now to FIG. 1 and by way of further background, a view of a three-dimensional volume data set 10 is shown. FIG. 1 depicts an array of voxel positions 12 arranged in the form of a rectangular solid. More particularly, the voxel positions fill the solid in three dimensions and are uniformly spaced. The position of each voxel can be represented in a coordinate system defined by the three axes 11 labeled X, Y, and Z. Associated with each voxel position is one or more data values representing some characteristics of the object, system, or phenomenon under study, for example density, type of material, temperature, velocity, opacity or other properties at discrete points in space throughout the interior and in the vicinity of that object or system. It is convenient to represent a volume data set in a computer as a three-dimensional array of values, with the value at array index position (X, Y, Z) corresponding to the volume data values at coordinates (X, Y, Z) in three-dimensional space.

Figure 2:
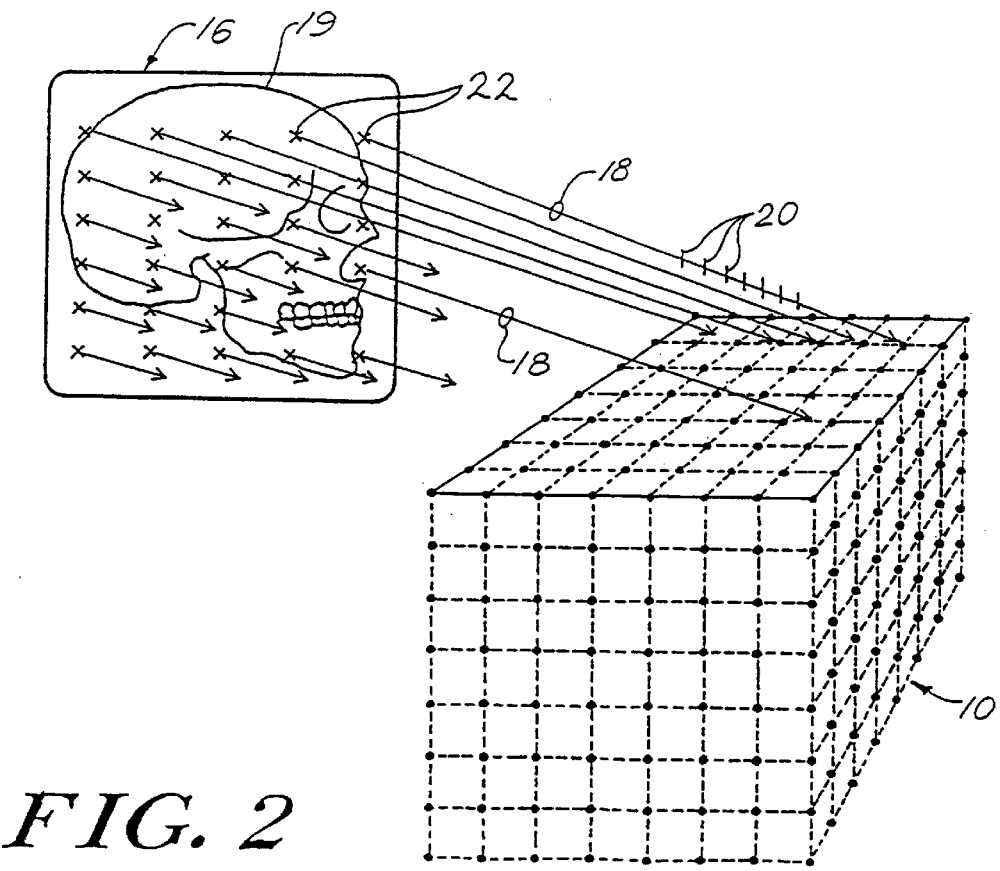
FIG. 2 is a diagrammatic illustration of a view of a volume data set being projected onto an image plane by means of ray-casting.

FIG. 2 illustrates an example of a volume data set 10 comprising an array of slices from a tomographic scan of the human head. A two-dimensional image plane 16 represents the surface on which a volume rendered projection of the human head is to be displayed. In a technique known as ray-casting, rays 18 are cast from pixel positions 22 on the image plane 16 through the volume data set 10, with each ray accumulating color and opacity from the data at voxel positions as it passes through the volume. In this manner the color, transparency, and intensity as well as other parameters of a pixel are extracted from the volume data set as the accumulation of data at sample points 20 along the ray. In this example, voxel values associated with bony tissue are assigned an opaque color, and voxel values associated with all other tissue in the head are assigned a transparent color. Therefore, the accumulation of data along a ray and the attribution of this data to the corresponding pixel result in an image 19 in viewing plane 16 that appears to an observer to be an image of a three-dimensional skull, even though the actual skull is hidden from view by the skin and other tissue of the head.

Figure 3:
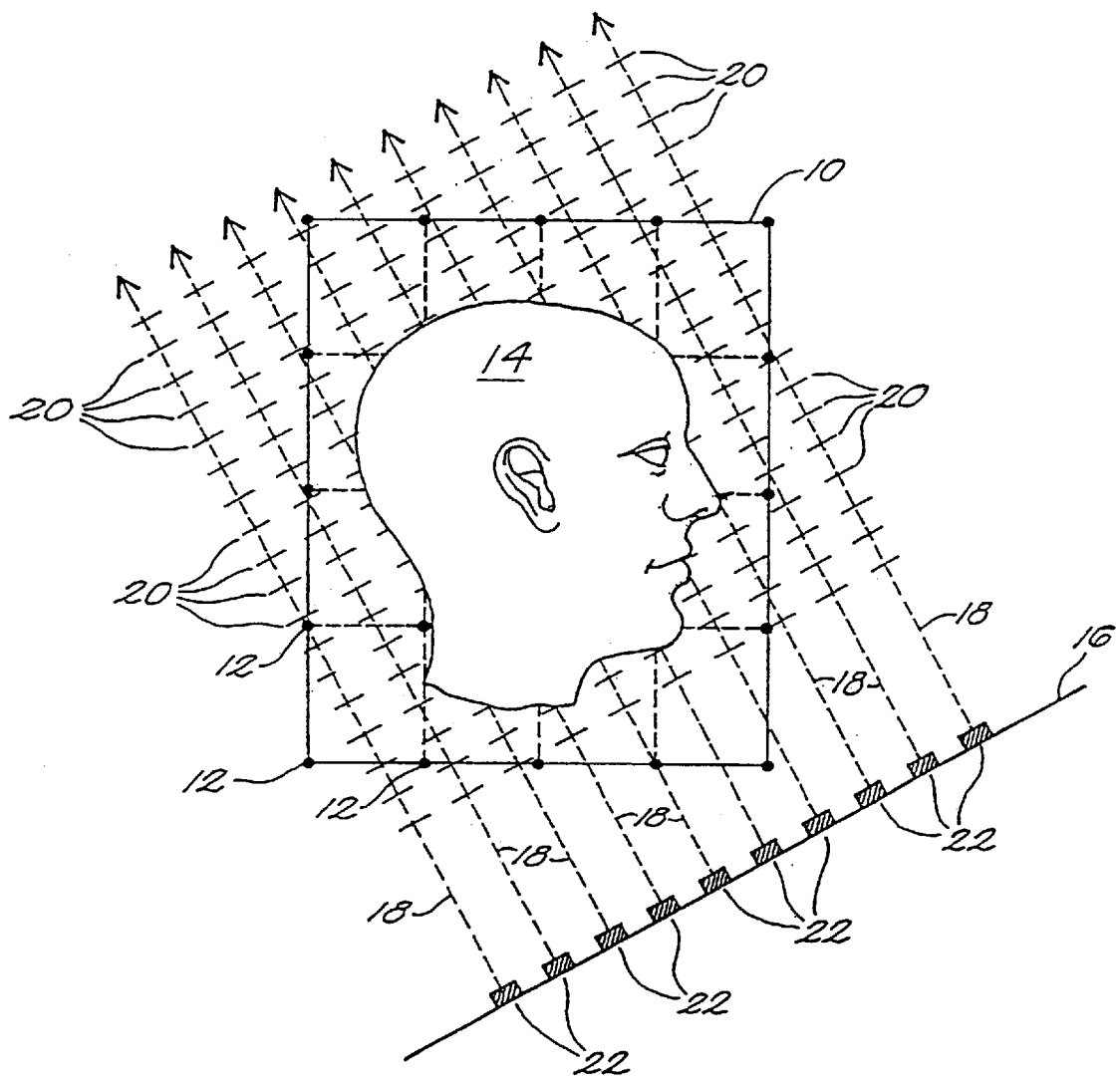
FIG. 3 is a cross-sectional view of the volume data set of FIG. 2.

In order to appreciate more fully the method of ray-casting, FIG. 3 depicts a two-dimensional cross-section of a three-dimensional volume data set 10 of FIG. 2. The first and second dimensions correspond to the dimensions illustrated on the plane of the page. The third dimension of volume data set 10 is perpendicular to the printed page so that only a cross section of the data set can be seen in the figure. Voxel positions are illustrated by dots 12 in the figure. The voxels associated with each position are data values that represent some characteristic or characteristics of a three-dimensional object 14 at fixed points of a rectangular grid in three-dimensional space. Also illustrated in FIG. 3 is a one-dimensional view of a two-dimensional image plane 16 onto which an image of object 14 is to be projected in terms of providing pixels 22 with the appropriate characteristics. In this illustration, the second dimension of image plane 16 is also perpendicular to the printed page.

In the technique of ray-casting, rays 18 are extended from pixels 22 of the image plane 16 through the volume data set 10. Each ray accumulates color, brightness, and transparency or opacity at sample points 20 along that ray. This accumulation of light determines the brightness and color of the corresponding pixels 22. Thus while the ray is depicted going outwardly from a pixel through the volume, the accumulated data can be thought of as being transmitted back down the ray where it is provided to the corresponding pixel to give the pixel color, intensity and opacity or transparency, amongst other parameters.

It will be appreciated that although FIG. 3 suggests that the third dimension of volume data set 10 and the second dimension of image plane 16 are both perpendicular to the printed page and therefore parallel to each other, in general this is not the case. The image plane may have any orientation with respect to the volume data set, so that rays 18 may pass through volume data set 10 at any angle in all three dimensions.

It will also be appreciated that sample points 20 do not necessarily intersect the voxel 12 coordinates exactly. Therefore, the value of each sample point must be synthesized from the values of voxels nearby. That is, the intensity of light, color, and transparency or opacity at each sample point 20 must be calculated or interpolated as a mathematical function of the values of nearby voxels 12. The re-sampling of voxel data values to values at sample points is an application of the branch of mathematics known as sampling theory. The sample points 20 of each ray 18 are then accumulated by another mathematical function to produce the brightness and color of the pixel 22 corresponding to that ray. The resulting set of pixels 22 forms a visual image of the object 14 in the image plane 16.

Figure 4:
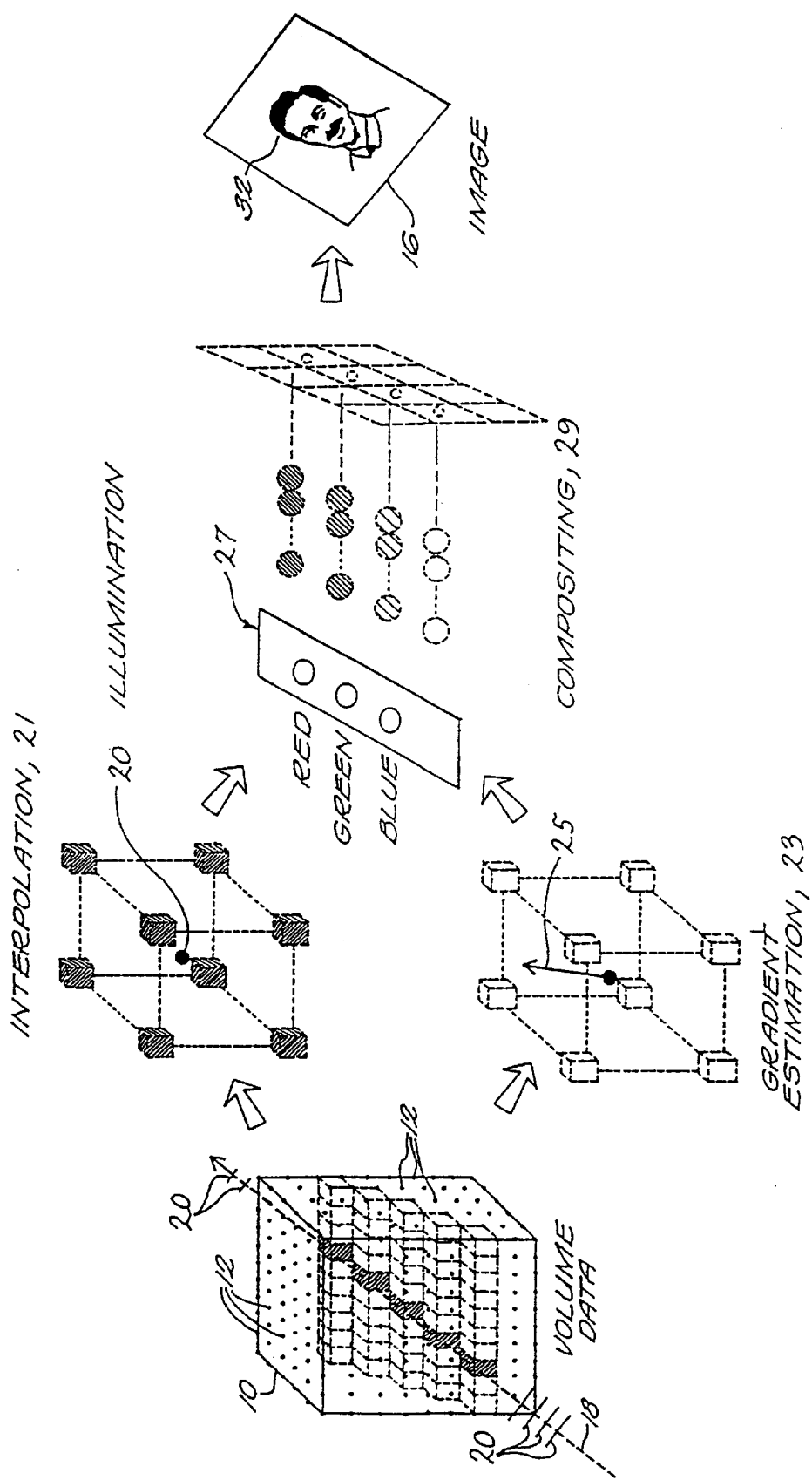
FIG. 4 is a diagrammatic illustration of the processing of an individual ray by ray-casting.

FIG. 4 illustrates the processing of an individual ray. Ray 18 passes through the three-dimensional volume data set 10 at some angle, passing near or possible through voxel positions 12, and accumulates data at sample points 20 along each ray. The value at each sample point is synthesized as illustrated at 21 by an interpolation unit 103 (see FIG. 5), and its gradient is calculated as illustrated at 23 by a gradient estimation unit 111 (see FIG. 5). The sample point values from sample point 20 and the gradient 25 for each sample point are then processed in the pipeline to assign color, brightness or intensity, and transparency or opacity to each sample. As illustrated at 27, this is done via pipeline processing in which red, green and blue hues as well as intensity and opacity or transparency are calculated. Finally, the colors, levels of brightness, and transparencies assigned to all of the samples along all of the rays are applied as illustrated at 29 to a compositing unit 124 that mathematically combines the sample values into pixels depicting the resulting image 32 for display on image plane 16.

The calculation of the color, brightness or intensity, and transparency of sample points 20 is done in two parts. In one part, a mathematical function such as trilinear interpolation is utilized to take the weighted average of the values of the eight voxels in a cubic arrangement immediately surrounding the sample point 20. The resulting average is then used to assign a color and opacity or transparency to the sample point by some transfer function. In the other part, the mathematical gradient of the sample values at each sample point 20 is estimated by a method such as taking the differences between nearby sample points. It will be appreciated that these two calculations can be implemented in either order or in parallel with each other to produce mathematically equivalent results. The gradient is then used in a lighting calculation to determine the brightness of the sample point. Lighting calculations are well-known in the computer graphics art and are described, for example, in the textbook "Computer Graphics: Principles and Practice," $2^{nd}$ edition, by J. Foley, A. vanDam, S. Feiner, and J. Hughes, published by Addison-Wesley of Reading, Mass., in 1990.

Figure 5:
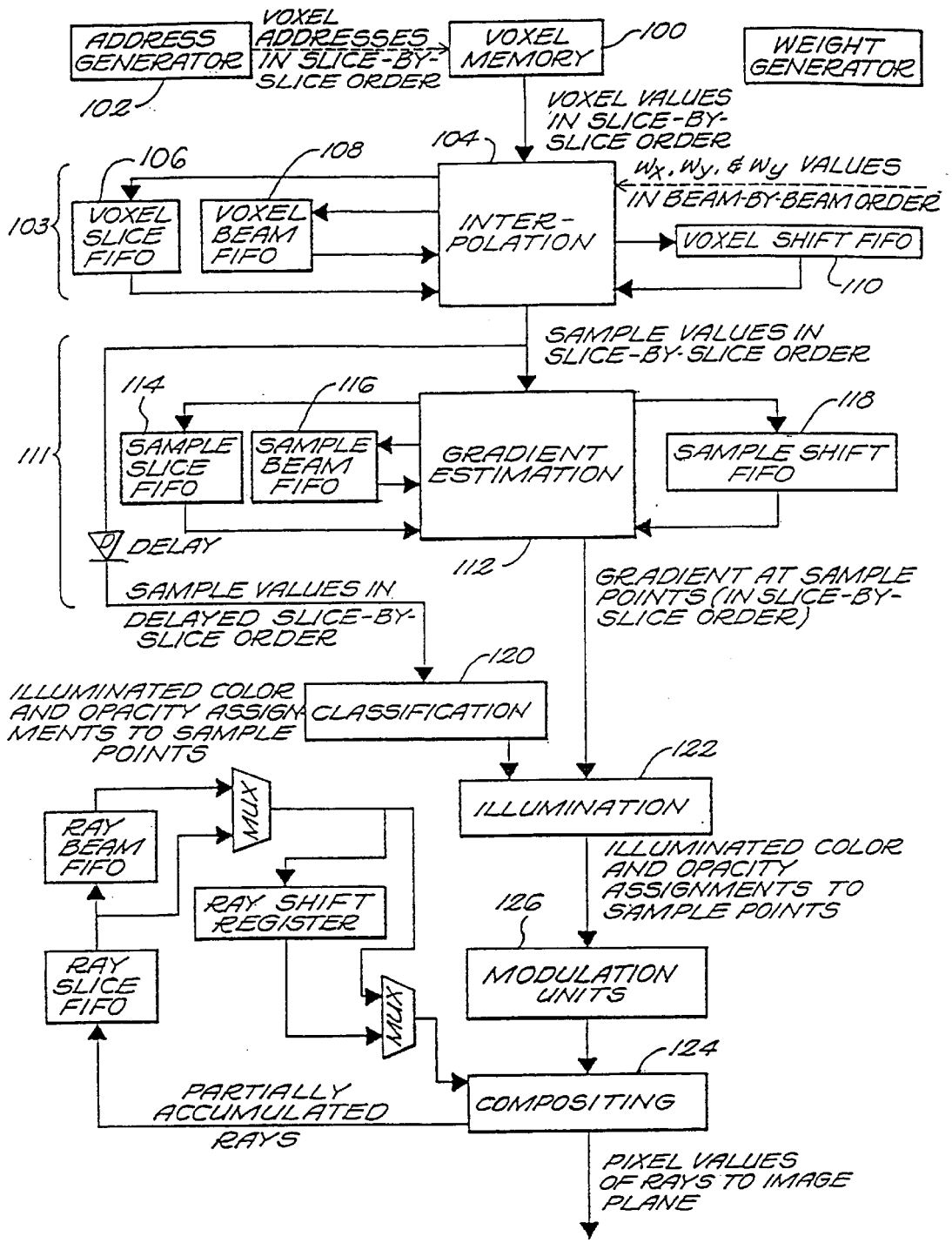
FIG. 5 is a block diagram of a pipelined processing element for real-time volume rendering in accordance with the present invention.

FIG. 5 depicts a block diagram of a pipelined processor appropriate for performing the calculations illustrated in FIG. 4. The pipelined processor comprises a plurality of pipeline stages, each stage of which holds one data element, so that a plurality of data elements are being processed at one time. Each data element is at a different degree of progress in its processing, and all data elements move from stage to stage of the pipeline in lock step. At the first stage of the pipeline, a series of voxel data values flow into the pipeline at a rate of one voxel per cycle from the voxel memory 100, which operates under the control of an address generator 102. The interpolation unit 104 receives voxel values located at coordinates X, Y and Z in three-dimensional space, where X, Y and Z are each integers. The interpolation unit 104 is a set of pipelined stages that synthesize data values at sample points between voxels corresponding to positions along rays that are cast through the volume. During each cycle, one voxel enters the interpolation unit and one interpolated sample value emerges. The latency between the time a voxel value enters the pipeline and the time that an interpolated sample value emerges depends upon the number of pipeline stages and the internal delay in each stage.

The interpolation stages of the pipeline comprise a set of interpolator stages 104 and three FIFO elements 106, 108, 110 for recirculating data through the stages. In the current embodiment, these are all linear interpolations, but other interpolation functions such as cubic and LaGrangian may also be employed. In the illustrated embodiment, interpolation is performed in each dimension as a separate stage, and the respective FIFO elements are included to recirculate data for purposes of interpolating between voxels that are adjacent in space but widely separated in the time of entry to the pipeline. The delay of each FIFO is selected to be exactly the amount of time elapsed between the reading of one voxel and the reading of an adjacent voxel in that particular dimension so that the two can be combined in an interpolation function. It will be appreciated that voxels can be streamed through the interpolation stage at a rate of one voxel per cycle with each voxel being combined with the nearest neighbor that had been previously recirculated through the FIFO associated with that dimension.

Three successive interpolation stages, one for each dimension, are concatenated and voxels can pass through the three stages at a rate of one voxel per cycle at both input and output. The throughput of the interpolation stages is one voxel per cycle independent of the number of stages within the interpolation unit and independent of the latency of the data within the interpolation unit and the latency of the recirculation stages within that unit. Thus, the interpolation unit converts voxel values located at integer positions in XYZ space into sample values located at non-integer positions at the rate of one voxel per cycle. In particular, the interpolation unit converts values at voxel positions to values at sample positions disposed along the rays.

Following the interpolation unit 104 is a gradient estimation unit 112, which also comprises a plurality of pipelined stages and recirculation FIFOs. The function of the gradient unit 112 is to derive the rate of change of the sample values in each of the three dimensions. The gradient estimation unit operates in a similar manner to the interpolation unit 104 and computes the rate of change of the sample values in each of the three dimensions. Note, the gradient is used to determine a normal vector for illumination, and its magnitude may be used as a measure of the existence of a surface when the gradient magnitude is high. In the present embodiment the calculation is obtained by taking central differences, but other functions known in the art may be employed.

Because the gradient estimation unit is pipelined, it receives one interpolated sample per cycle, and it outputs one gradient per cycle. As with the interpolation unit, each gradient is delayed from its corresponding sample by a number of cycles which is equal to the amount of latency in the gradient estimation unit 112 including respective recirculation FIFOs 114, 116, 118. The delay for each of the recirculation FIFOs is determined by the length of time needed between the reading of one interpolated sample and nearby interpolated samples necessary for deriving the gradient in that dimension.

The interpolated sample and its corresponding gradient are concurrently applied to the classification and illumination units 120 and 122 respectively at a rate of one interpolated sample and one gradient per cycle. Classification unit 120 serves to convert interpolated sample values into colors in the graphics system; i.e., red, green, blue and alpha values, also known as RGBA values. The red, green, and blue values are typically fractions between zero and one inclusive and represent the intensity of the color component assigned to the respective interpolated sample value. The alpha value is also typically a fraction between zero and one inclusive and represents the opacity assigned to the respective interpolated sample value.

The gradient is applied to the illumination unit 122 to modulate the newly assigned RGBA values by adding highlights and shadows to provide a more realistic image. Methods and functions for performing illumination are well known in the art. The illumination and classification units accept one interpolated sample value and one gradient per cycle and output one illuminated color and opacity value per cycle.

Although in the current embodiment, the interpolation unit 104 precedes the gradient estimation unit 112, which in turn precedes the classification unit 120, it will be appreciated that in other embodiments these three units may be arranged in a different order. In particular, for some applications of volume rendering it is preferable that the classification unit precede the interpolation unit. In this case, data values at voxel positions are converted to RGBA values at the same positions, then these RGBA values are interpolated to obtain RGBA values at sample points along rays.

The compositing unit 124 combines the illuminated color and opacity values of all sample points along a ray to form a final pixel value corresponding to that ray for display on the computer terminal or two-dimensional image surface. RGBA values enter the compositing unit 124 at a rate of one RGBA value per cycle and are accumulated with the RGBA values at previous sample points along the same ray. When the accumulation is complete, the final accumulated value is output as a pixel to the display or stored as image data. The compositing unit 124 receives one RGBA sample per cycle and accumulates these ray by ray according to a compositing function until the ends of rays are reached, at which point the one pixel per ray is output to form the final image. A number of different functions well known in the art can be employed in the compositing unit, depending upon the application.

Between the illumination unit 122 and the compositing unit 124, various modulation units 126 may be provided to permit modification of the illuminated RGBA values, thereby modifying the image that is ultimately viewed. One such modulation unit is used for cropping the sample values to permit viewing of a restricted subset of the data. Another modulation unit provides a function to show a slice of the volume data at an arbitrary angle and thickness. A third modulation unit provides a three-dimensional cursor to allow the user or operator to identify positions in XYZ space within the data. Each of the above identified functions is implemented as a plurality of pipelined stages accepting one RGBA value as input per cycle and emitting as an output one modulated RGBA value per cycle. Other modulation functions may also be provided which may likewise be implemented within the pipelined architecture herein described. The addition of the pipelined modulation functions does not diminish the throughput (rate) of the processing pipeline in any way but rather affects the latency of the data as it passes through the pipeline.

In order to achieve a real-time volume rendering rate of, for example, 30 frames per second for a volume data set with 256×256×256 voxels, voxel data must enter the pipelines at $256^3 \times 30$ frames per second or approximately 500 million voxels per second. It will be appreciated that although the calculations associated with any particular voxel involve many stages and therefore have a specified latency, calculations associated with a plurality of different voxels can be in progress at once, each one being at a different degree of progression and occupying a different stage of the pipeline. This makes it possible to sustain a high processing rate despite the complexity of the calculations.

It will be further appreciated that the above described pipelined processor can be replicated as a plurality of parallel pipelines to achieve higher throughput rates by processing adjacent voxels in parallel. The cycle time of each pipeline is determined by the number of voxels in a typical volume data set, multiplied by the desired frame rate, and divided by the number of pipelines. In a preferred embodiment, the cycle time is 7.5 nanoseconds and four pipelines are employed in parallel, thereby achieving a processing rate of more than 500 million voxel values per second.

Mini-blocks

Figure 6:
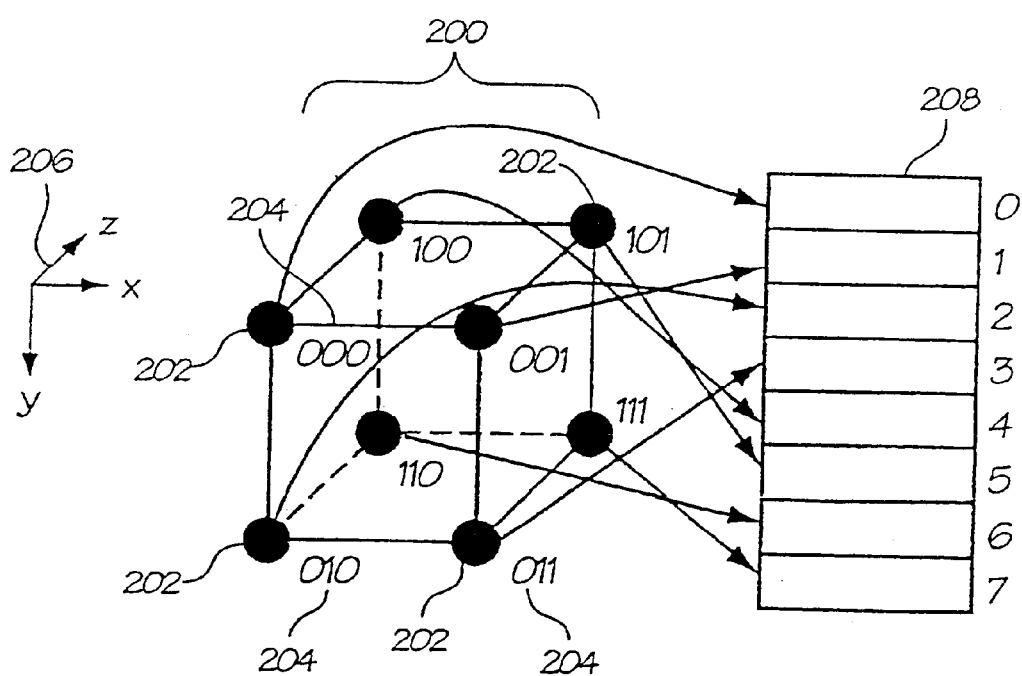
FIG. 6 is a diagrammatic representation of the mapping of voxels comprising a mini-block to an SDRAM.
Figure 7:
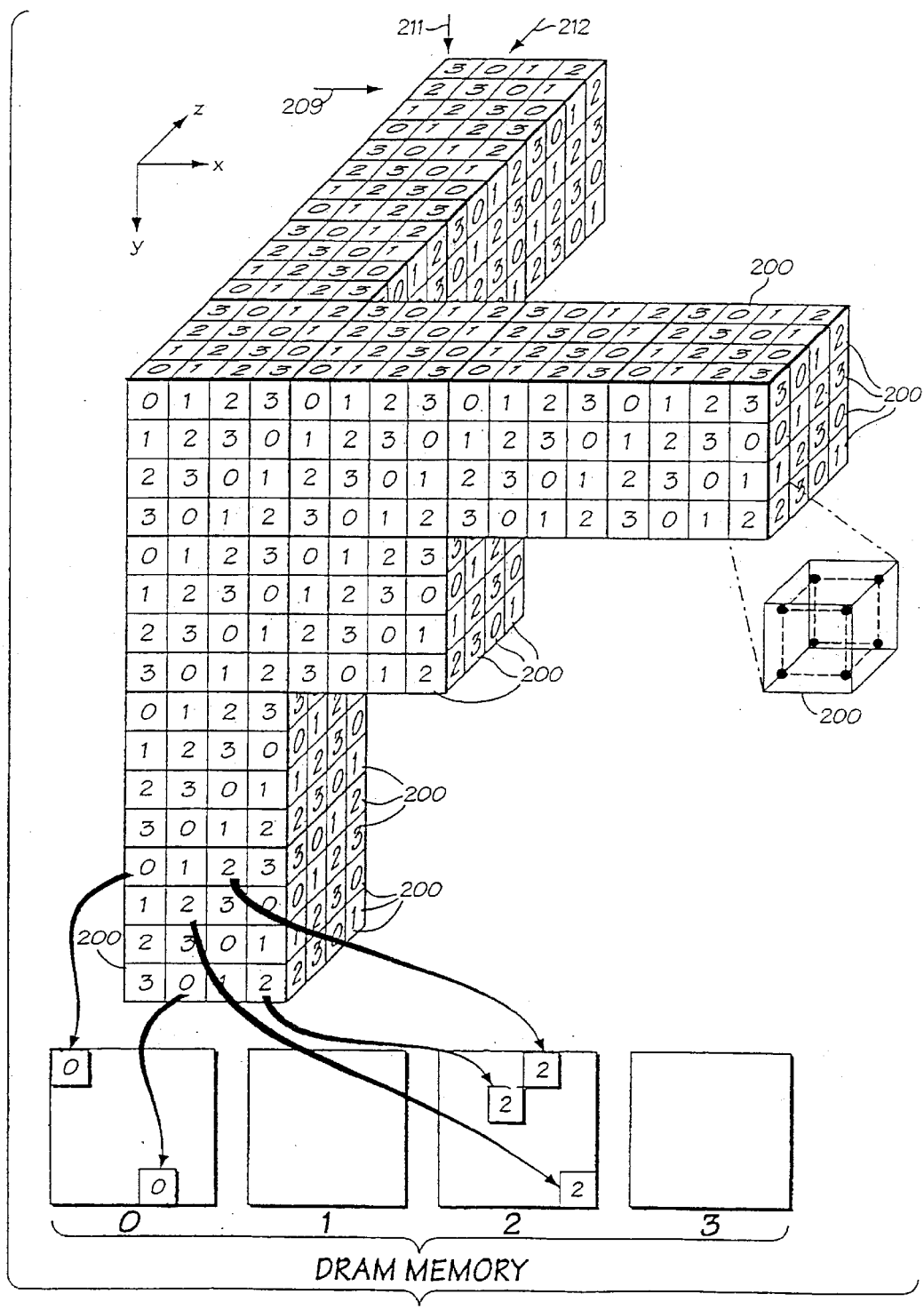
FIG. 7 is a diagrammatic representation of mini-blocks in memory.

Referring now to FIGS. 6 and 7, the subject invention utilizes the method of blocking of EM-Cube, as described in U.S. patent application Ser. No. 08/905,238, cited above, where in one embodiment each block comprises eight voxels arranged in a cubic array of size 2×2×2, also called a "mini-block." FIG. 6 illustrates an array 200 of eight neighboring voxels 202 arranged in three-dimensional space according to the coordinate system of axes 206. The data values of the eight voxels 202 are stored in an eight-element array of memory 208. Each voxel occupies a position in three-dimensional space denoted by coordinates (X, Y, Z), where X, Y, and Z are all integers. The index of a voxel data value within the memory array of its mini-block is determined from the lower order bit of each of the X, Y, and Z coordinates. As illustrated in FIG. 6,. these three low-order bits are concatenated to form a three-bit binary number 204 ranging in value from zero to seven, which is then utilized to identify the array element corresponding that that voxel. In other words, the array index within a mini-block of the data value of a voxel at coordinates (X, Y, Z) is given by $$(X \bmod 2) + 2 \times (Y \bmod 2) + 4 \times (Z \bmod 2). \quad (1)$$

Just as the position of each voxel or sample can be represented in three dimensional space by coordinates (X, Y, Z), so can the position of a mini-block be represented in mini-block coordinates ($X_{mb}$, $Y_{mb}$, $Z_{mb}$). In these coordinates, $X_{mb}$ represents the position of the mini-block along the X axis, counting in units of whole mini-blocks. Similarly, $Y_{mb}$ and $Z_{mb}$ represent the position of the mini-block along the Y and Z axes, respectively, counting in whole mini-blocks. Using this notation of mini-block coordinates, the position of the mini-block containing a voxel with coordinates (X, Y, Z) is given by $$X_{mb} = \left\lfloor \frac{X}{2} \right\rfloor, \qquad Y_{mb} = \left\lfloor \frac{Y}{2} \right\rfloor, \qquad Z_{mb} = \left\lfloor \frac{Z}{2} \right\rfloor. \quad (2)$$

Referring now to FIG. 7, the first level of mini-block skewing is illustrated. This is an application of the method of skewing of blocks from EM-Cube in accordance with the following formula:

$$\text{DRAMNumber} = (X_{mb} + Y_{mb} + Z_{mb}) \bmod 4, \quad (3)$$

In the figure, a partial view of a three-dimensional array of mini-blocks 200 is illustrated, each mini-block being depicted by a small cube labeled with a numeral. The numeral represent the assignment of that mini-block to a particular DRAM module chip. In the illustrated embodiment, there are four different DRAM chips labeled 0, 1, 2, and 3. It will be appreciated from the figure that each group of four mini-blocks aligned with an axis contains one mini-block with each of the four labels. This can be confirmed from Equation 3. That is, starting with any mini-block at coordinates ($X_{mb}$, $Y_{mb}$, $Z_{mb}$) and sequencing through the mini-blocks in the direction of the X axis, the DRAMNumber of Equation 3 cycles continually through the numbers 0, 1, 2, and 3. Likewise, by sequencing through the mini-blocks parallel to the Y or Z axis, Equation 3 also cycles continually through the DRAMNumbers 0, 1, 2, and 3. Therefore, it will be appreciated that when traversing the three-dimensional array of mini-blocks in any direction 209, 211, or 213 parallel to any of the three axes, groups of four adjacent mini-blocks can always be fetched in parallel from the four independent memory of the DRAM chips. The assignment of mini-blocks to memory locations within a memory module is discussed below.

More generally, if a system contains M independent memory modules, then the mini-block with coordinates ($X_{mb}$, $Y_{mb}$, $Z_{mb}$) is assigned to a memory module as follows:

$$\text{ModuleNumber} = (X_{mb} + Y_{mb} + Z_{mb}) \bmod M. \quad (4)$$

That is, if the memory subsystem of the illustrated embodiment comprises M separate modules such that all M can be accessed concurrently in the same amount of time required to access one module, then the assignment of a mini-block to a memory module is given by summing the coordinates of the mini-block, dividing by M and taking the remainder. This guarantees that any group of M blocks aligned with any axis can be fetched simultaneously and concurrently. It will be appreciated that the requirement for fetching groups of M mini-blocks concurrently along any axis of the volume data set is because order of traversal of the volume data set is dependent upon the view direction.

Although in the illustrated embodiment, mini-blocks are accessed in linear groups aligned with the axes of the volume data set, it will be appreciated that other embodiments may skew mini-blocks by different formulas so that they can be fetched in rectangular groups, cubic groups, or groups of other size and shape, independent of the order of traversal of the volume data set.

In modern DRAM chips, it is possible to fetch data from or write data to the DRAM chip in bursts of modest size at the clock rate for the type of DRAM. Typical clock rates for so-called Synchronous DRAM or "SDRAM" chips include 133 MHz, 147 MHz, and 166 MHz, corresponding 7.5 nanoseconds, 7 nanoseconds, and 6 nanoseconds per cycle, respectively. Typical burst sizes needed to sustain the clock rate are five to eight memory elements of sixteen bits each. Other types of DRAM under development have clock rates up to 800 MHz and typical burst sizes of sixteen data elements of sixteen bits each. In these modern DRAM chips, consecutive bursts can accommodated in without intervening idle cycles, provided that they are from independent memory banks within the DRAM chip. That is, groups of consecutively addressed data elements are stored in different or non-conflicting memory banks of a DRAM chip, then they can be read or written in rapid succession, without any intervening idle cycles, at the maximum rated speed of the DRAM.

Figure 8:
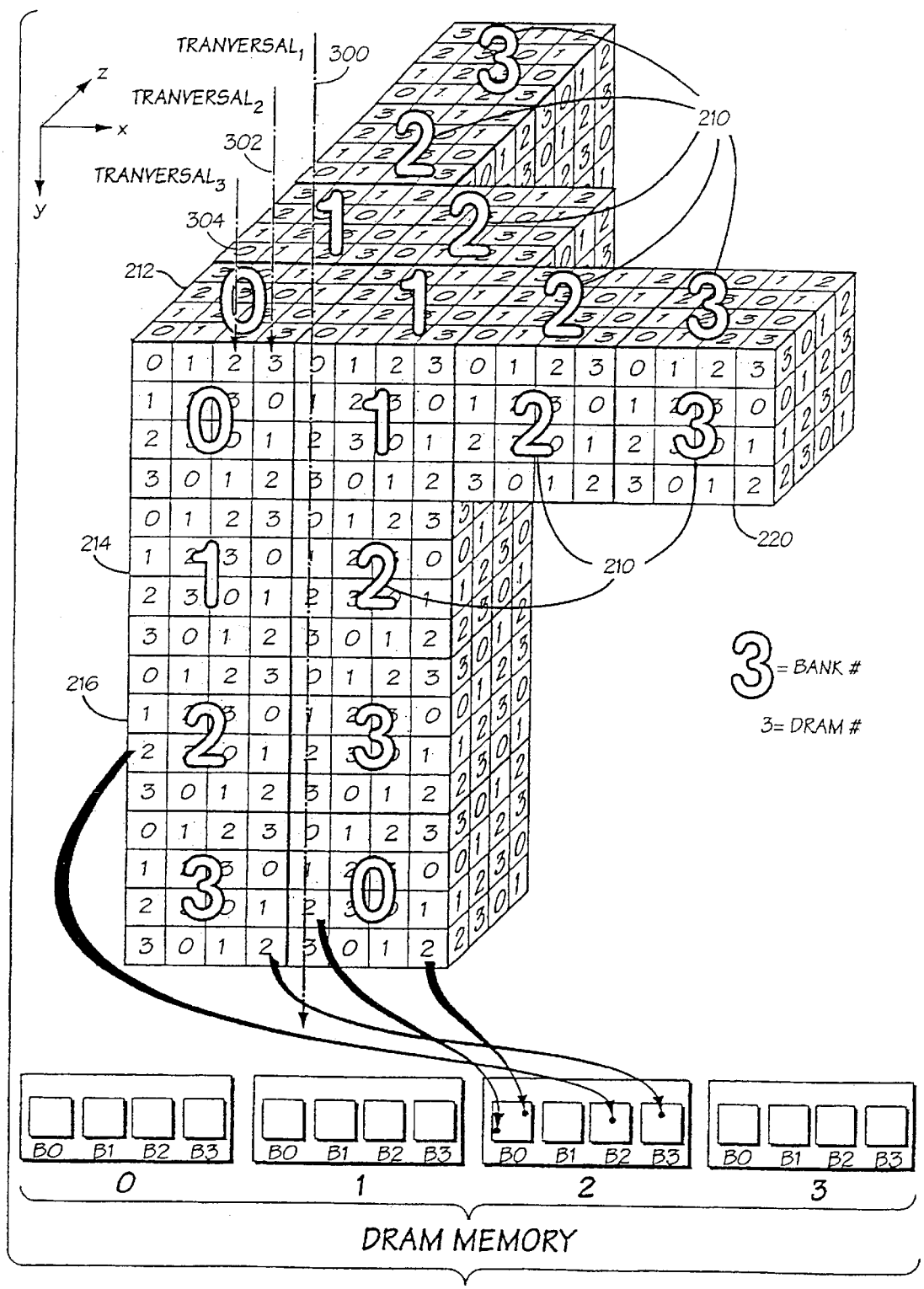
FIG. 8 is a diagrammatic representation of mini-blocks within the banks and rows of the DRAMs.

Referring now to FIG. 8, the min-blocks are further arranged in groups corresponding to banks of the DRAMs. This constitutes the second level of voxel skewing. Each group of 4×4×4 mini-blocks is labeled with a large numeral. Each numeral depicts the assignment of each mini-block of that group to the bank with the same numeral in its assigned DRAM chip. For example, the group of mini-blocks 212 in the figure is labeled with numeral 0. This means that each mini-block within group 212 is stored in bank 0 of its respective memory chip. Likewise, all of the mini-blocks of group 214 are stored in bank 1 of their respective memory chips, and all of the mini-blocks of group 216 are stored in bank 2 of their respective memory chips.

In the illustrated embodiment, each DRAM module has four banks, labeled 0, 1, 2, and 3. A mini-block with coordinates ($X_{mb}$, $Y_{mb}$, $Z_{mb}$) is assigned to the bank according to the following formula:

$$\text{BankNumber} = \left( \left\lfloor \frac{X_{mb}}{4} \right\rfloor + \left\lfloor \frac{Y_{mb}}{4} \right\rfloor + \left\lfloor \frac{Z_{mb}}{4} \right\rfloor \right) \bmod 4. \quad (5)$$

The fact that the number of banks per DRAM chip is the same as the number of DRAM chips in the illustrated embodiment is a coincidence.

It will be appreciated from the figure that when a set of pipelined processing elements traverses the volume data set in any given orthogonal direction, fetching four mini-blocks at a time in groups parallel to any axis, adjacent groups, such as Group 0 and Group 1, are always in different banks. This means that groups of four mini-blocks can be fetched in rapid succession, taking advantage of the "burst mode" access of the DRAM chips, and without intervening idle cycles on the part of the DRAM chips, for traversal along any axis. This maximizes the efficiency of the DRAM bandwidth.

More generally, the assignment of mini-blocks to memory banks can be skewed in a way similar to the assignment of mini-blocks to memory chips. In other words, mini-blocks can be skewed across M memory chips so that concurrent access is possible no matter which direction the volume data set is being traversed. Likewise, mini-blocks within each chip can be skewed across B memory banks, so that accesses to consecutive mini-blocks within a bank are not delayed by intervening idle cycles. This forms a two-level skewing of mini-blocks across chips and banks. In the illustrated embodiment, the assignment of a mini-block to a memory bank is given by the formula $$BankNumber = \left(\left\lfloor \frac{X_{mb}}{M} \right\rfloor + \left\lfloor \frac{Y_{mb}}{M} \right\rfloor + \left\lfloor \frac{Z_{mb}}{M} \right\rfloor\right) \bmod B. \quad (6)$$

It will be appreciated, however, that other embodiments may skew mini-blocks across banks by other rules, for example by skewing in each dimension by a different distance such that the distances in the three dimensions are relatively prime to each other.

In the illustrated embodiment, a mini-block is assigned to its specific memory address within its DRAM as follows. Assume that the volume data set is SX mini-blocks in width along the X axis, SY mini-blocks in height along the Y axis, and SZ mini-blocks in depth along the Z axis. Then it comprises a total of SX×SY×SZ mini-blocks. Assume further that each of SX, SY, and SZ, is a multiple of the number of DRAM chips times the number of banks per chip. That is, in the illustrated embodiment, each of SX, SY, and SZ, is a multiple of 16. Then, let the MiniBlockNumber of the mini-block with coordinates ($X_{mb}$, $Y_{mb}$, $Z_{mb}$) be defined by:

$$MiniBlockNumber = X_{mb} + Y_{mb} \times SX + Z_{mb} \times SX \times SY. \quad (7)$$

Its assignment to a DRAMNumber and BankNumber are given by Equations 3 and 5 respectively. Then the index of the mini-block within its bank, MiniBlockIndexInBank, is defined by $$MiniBlockIndexInBank = \left\lfloor \frac{MiniBlockNumber}{16} \right\rfloor. \quad (8)$$

That is, there are four DRAM modules, each with four banks, for a total of sixteen banks. Therefore, the position of a mini-block within a bank is its Mini-blockNumber divided by the total number of banks. Finally, in the illustrated embodiment, each row of a bank is capable of holding 32 mini-blocks, that is 32×8 voxels of 16 bits each, or a total of 4096 bits. Therefore, the row number and offset within a row are given by $$row = \left\lfloor \frac{MiniBlockIndexInBank}{32} \right\rfloor. \quad (9)$$

It will be appreciated that other embodiments may make assignments of mini-blocks to addresses within memory banks by different other formulas within the spirit of this invention.

Traversal Order

In the subject invention, a volume data set is reoriented prior to rendering so that rays parallel to the view direction always pass through the volume data set the direction from front to back left to right, and top to bottom, independent of the orientation of the volume data set in memory. This defines the traversal of the voxels of the volume data set. In particular, the traversal must follow the direction of the rays so that samples derived from later processed voxels can be composited after samples of earlier processed voxels. Therefore, the traversal of voxels may begin at an arbitrary corner of the volume data set, depending upon the view direction, and may proceed in groups of M mini-blocks along any axis, also dependent upon the view direction.

Although the method of bank skewing described above avoids the situation of fetching two mini-blocks consecutively from the same bank of the same chip within any row, regardless of view direction, there are generally one or more exception cases. These result from traversing from the end of one row of mini-blocks to the beginning of the next row of mini-blocks. An example is illustrated in FIG. 8. Although there is never an exception when mini-blocks are fetched in groups parallel to the X axis or parallel to the Z axis, there is an exception for groups parallel to the Y axis. This occurs when the view direction is such that the origin must be placed in the upper right corner of the volume data set and that traversal must proceed first in the positive Y direction, then in the negative X direction, and finally in the positive Z direction. That is, the primary direction of traversing the volume data set is parallel to dotted line 300 of FIG. 8. This goes downwardly through the mini-blocks of Groups 1, 2, 3 and 0, reading the individual voxels along its path. The next row of mini-blocks in this traversal order is indicated by dotted line 302, again proceeding from the top of the figure to the bottom. It can be seen from the figure that the traversal along line 300 ends with bank 0 and the traversal along line 302 begins with the same bank. This, of course, is a prohibited sequence of accesses and would result either extra idle cycles being inserted into the pipeline or in a violation of the access specifications of the DRAM chip. Note, however, there is no exception as the traversal passes from dotted line 302 to dotted line 304.

The solution to the exception cases is to recognize them during the traversal and to traverse the offending row of the volume data set in the opposite direction of the previous row. A mechanism for doing this is described below.

De-skewing

Each mini-block is read as a set of consecutive memory addresses from its memory chip and bank. It will be appreciated therefore that the order of reading voxel values from a mini-block does not necessarily correspond to the order in which voxels are processed. To take account for this situation, a method of de-skewing is introduced as follows.

Figure 9:
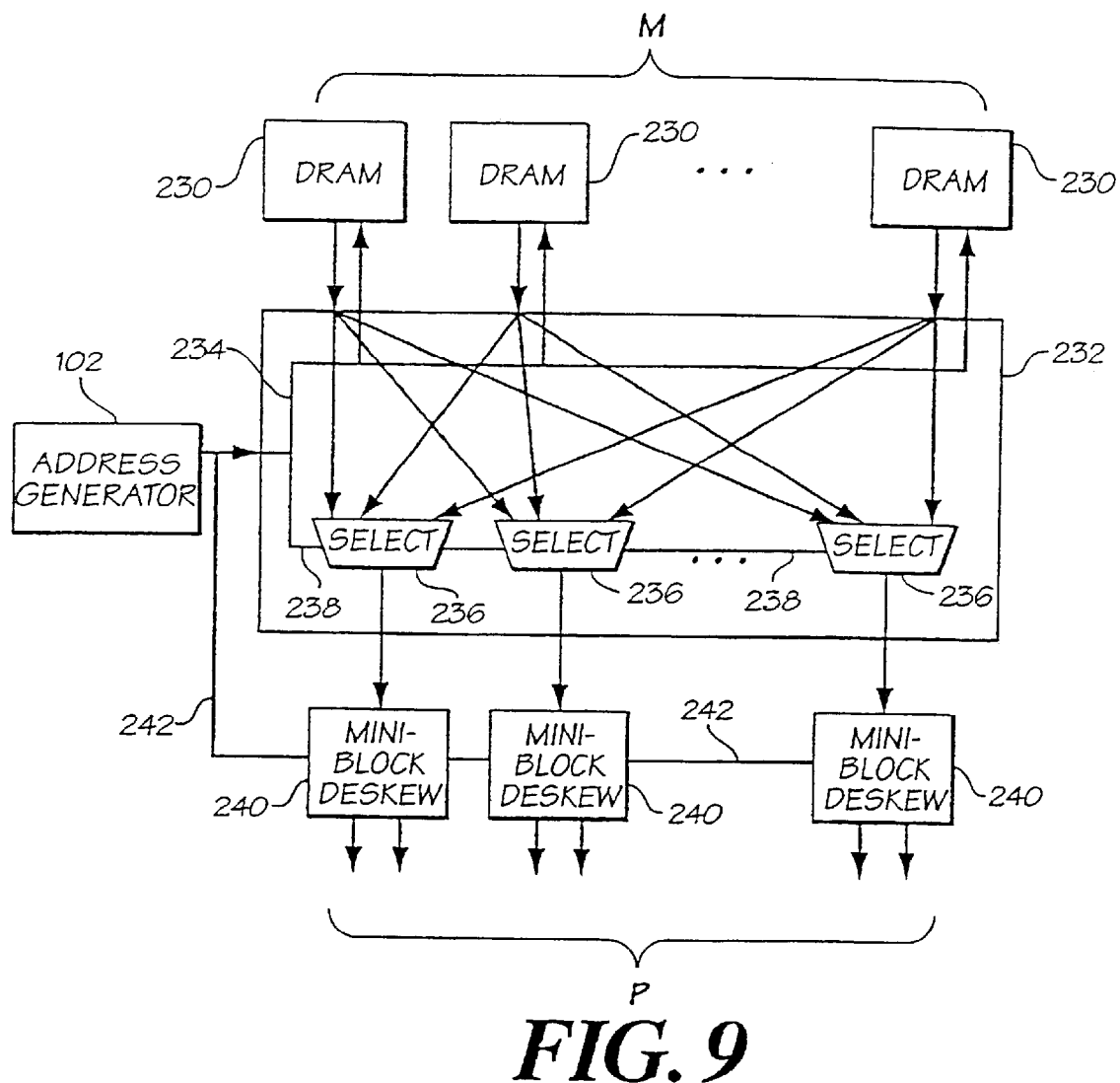
FIG. 9 is a block diagram of a de-skewing network for rearranging voxels of mini-blocks into a natural processing order.

Referring now to FIG. 9, a de-skewing network is shown for rearranging the voxel data values of a group of M mini-blocks to present them in the correct traversal order to the parallel processing pipelines of the volume rendering system. At the top of FIG. 9, M independent DRAM chips 230 comprise the Voxel Memory 100 of FIG. 5. Mini-blocks are read concurrently from these M chips under the control of Address Generator 102, which generates memory addresses 234 of mini-blocks in the order of traversal of the volume data set. The memory input from DRAM chips 230 is coupled to a set of Selection units 236 which also operate under the control of the Address Generator 102 via Selection signal 238. As M mini-blocks are read from their corresponding memory modules 230, Selection units 236 effectively rearrange or permute them so that their alignment from left to right corresponds to the physical position of the mini-blocks in the volume data set, regardless of which memory modules they came from. That is, each Selection unit 236 selects its input from at most one of the DRAM chips, and each DRAM chip 230 is selected by at most one Selection unit.

The outputs of the Selection units 236 are then coupled to Mini-block De-skewing units 240. Operating under the control of Address Generator 102 via signal line 242, each Mini-block De-skewing unit rearranges the data values within its mini-block so that they are presented in an order corresponding to the physical position of each voxel relative to the order of traversal, e.g. their natural order. A total of P streams of voxel values are output from the Mini-block De-skewing units and coupled to the Interpolation units 103 of P pipelines of the type illustrated in FIG. 5. It will be appreciated that the number of memory chips M may be less than, the same as, or greater than the number of processing pipelines P.

Figure 10:
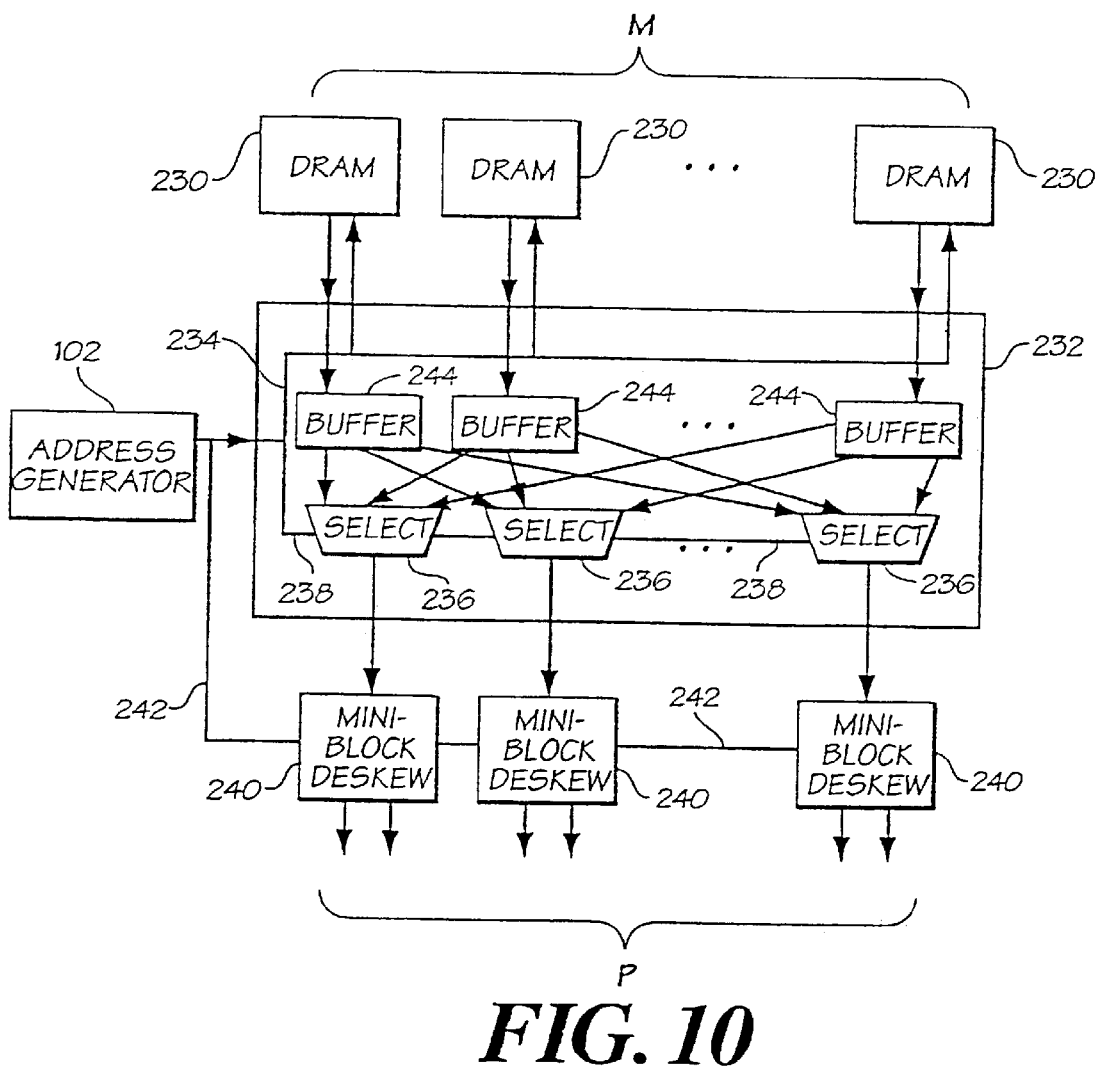
FIG. 10 is block diagram illustrating the addition of buffers to FIG. 9 for the purpose of enabling reading rows of mini-blocks to proceed in either order.

By the means shown above, it is possible to read data from voxel memory at a sustained rate of one voxel data value per cycle from any view direction, with no delays due to memory or bank conflicts, but with one exception. The exception, cited above, is when the bank at the end of one column or row is the same as the bank at the start of another column or row. If this exception were not recognized, then there would be a delay of several cycles at the ends of the offending rows while each DRAM chip pre-charges its bank in order to read a second consecutive mini-block from the same bank. This delay would propagate through the entire pipeline of FIG. 5, necessitating extra control circuitry and complexity. To alleviate this problem, extra buffers 244 are introduced between DRAM chips 230 and Selection units 236, as illustrated in FIG. 10. Each buffer is large enough to accommodate as many mini-blocks as will be read from a single memory module 230 in one row. Whenever an offending row is encountered, fetching from DRAM chips proceeds from bottom to top or right to left, instead of the normal top to bottom or left to right, also under the control of Address Generator 102. Data for a row of mini-blocks is stored in the buffers, then taken out by Selection units 236 in either first-in, first-out order or last-in, first-out order, depending upon whether the column or row is a normal column or row or an offending column or row, respectively.

In the illustrated embodiment, volume data sets are partitioned into sections. A typical section has 32 voxels or 16 mini-blocks in each row in the direction of traversal. The number of memory modules M is four. Therefore, each buffer 244 need hold only four mini-blocks in order that a row can be traversed in either order. By this means, voxel data can be read from DRAM memory modules in bursts at the maximum rated speed, regardless of viewing direction, without interruption, intervening idle cycles, or delays.

Having now described a few embodiments of the invention. and some modifications and variations thereto, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A method for arranging voxel data in DRAM memory modules to avoid idle cycles during data transfer in a volume rendering system, thereby permitting real time volume rendering by data transfer at the maximum burst rate of the DRAM memory modules, comprising the steps of:

arranging voxel data from a volume data set into mini-blocks;

providing a number of DRAM modules each having a number of DRAM memory banks; and, within each DRAM module, assigning mini-blocks to the memory banks thereof so that consecutively accessed mini-blocks are assigned to different banks within the associated DRAM module, said mini-blocks being assigned both to a specific DRAM and a specific bank within a DRAM in a two-level storage system, such that upon consecutive accessing of said banks, idle cycles during data transfer from the associated DRAM module are avoided.

2. The method of claim 1, and further including the steps of reading out voxel data from banks of DRAM memory in a predetermined order, detecting when said read out results in a conflict, and reversing the read out order responsive to detecting said conflict.

3. The method of claim 2, wherein said conflict includes a subsequent read out from the same memory bank as currently being read out.

4. The method of claim 1, and further including the steps of reordering voxel data read out from DRAM memory to permit voxel processing in the order in which said voxels are arranged in said volume data set.

5. The method of claim 1, wherein each of said mini-blocks includes eight voxels in a cubic array of 2×2×2 voxels.

6. The method of claim 1, wherein said mini-blocks are stored in said DRAM modules in accordance with DRAM Module Number=$(X_{mb}+Y_{mb}+Z_{mb})$mod M where $X_{mb}+Y_{mb}+Z_{mb}$ define the position of a mini-block containing a voxel with coordinates (X,Y,Z) given by $$X_{mb} = \left\lfloor \frac{X}{2} \right\rfloor, \quad Y_{mb} = \left\lfloor \frac{Y}{2} \right\rfloor, \quad Z_{mb} = \left\lfloor \frac{Z}{2} \right\rfloor$$

and wherein all M modules can be accessed concurrently in the same amount of time required to access one module, such that by summing the coordinates of the mini-block, dividing by M and taking the remainder, any group of M blocks aligned with any axis of said volume data set can be guaranteed to be fetched simultaneously and concurrently.

7. The method of claim 6, wherein a mini-block with coordinates ($X_{mb}$, $Y_{mb}$, $Z_{mb}$) is assigned to a bank in accordance with the following formula $$BankNumber = \left(\left\lfloor \frac{X_{mb}}{M} \right\rfloor + \left\lfloor \frac{Y_{mb}}{M} \right\rfloor + \left\lfloor \frac{Z_{mb}}{M} \right\rfloor\right) \bmod B,$$

where M is the number of independent memory chips and B is the number of banks per chip, and where B is the number of banks per DRAM chip.

* * * * *